United States Patent
De Coene

[15] 3,669,291
[45] June 13, 1972

[54] GRAIN TANK UNLOADING DEVICE FOR COMBINES

[72] Inventor: Frans J. De Coene, Zedelgem, Belgium
[73] Assignee: Clayson N.V., Zedelgem, Belgium
[22] Filed: July 22, 1970
[21] Appl. No.: 57,249

[30] Foreign Application Priority Data

July 30, 1969  Belgium....................................49355

[52] U.S. Cl..............................214/519, 214/83.32, 198/64
[51] Int. Cl.........................................................B60p 1/42
[58] Field of Search............................214/519–522, 83.32;
198/72–74, 53, 64; 259/21, 41, 97; 56/14.3–14.6, 13.3, 16.4; 222/318, 109, 412, 413

[56] References Cited

UNITED STATES PATENTS

| | | | |
|---|---|---|---|
| 2,883,076 | 4/1959 | Palmer | 214/519 X |
| 2,877,914 | 3/1959 | Herr | 214/522 |
| 1,799,544 | 4/1931 | Woodford et al. | 198/72 |
| 3,356,270 | 12/1967 | Heider | 222/413 |
| 3,273,734 | 9/1966 | Schuler | 259/97 X |
| 3,477,599 | 11/1969 | De Coene | 214/519 |

Primary Examiner—Albert J. Makay
Attorney—Joseph A. Brown, John C. Thompson, James J. Kennedy and George C. Bower

[57] ABSTRACT

The invention comprises an improved grain tank unloading device for agricultural machines, more especially combine-harvesters of the type having a grain tank for temporary storage of the harvested material, wherein two parallel augers are mounted on top of the grain tank bottom extending across the direction of travel, one of said augers having its discharge end at the outlet opening of the grain tank, in combination therewith a third auger, mounted perpendicular to both of said parallel augers, at the grain tank side opposite to the outlet opening and having its front end close to the discharge end of the first of the parallel augers and its discharge end close to the front end of the next of the parallel augers, which itself ends at the outlet opening of the grain tank.

11 Claims, 9 Drawing Figures

GRAIN TANK UNLOADING DEVICE FOR COMBINES

BACKGROUND OF THE INVENTION

1. Field of the Invention

The invention relates to the field of agricultural machines having a storage bin such as combine harvesters having a storage bin for temporary storage of grain or similar crop materials during the harvesting with such harvester machines, and more particularly to the unloading device of such storage bins.

As generally known in the art such combine harvesters have a cutting device in front of a so-called header for cutting the standing crop, a header and straw elevator for feeding the cut crop into the crop handling devices, said crop handling devices mainly comprising threshing, separating and cleaning means for threshing the cut crop materials for separating grains from the straw and for cleaning the threshed and separated grains. Clean grain is temporarily stored in the grain storage bin as mentioned above.

2. Description of the Prior Art

It has been known in the art to provide combine harvesters with a grain tank, having sloping bottom walls, which are downwardly inclined towards each other and to mount a discharge auger or grain tank bottom auger on top of the lower part of the grain tank bottom where said inclined bottom walls are connected to each other. Grain is thus fed by gravity towards said discharge auger, which itself feeds the grain towards the unloading tube provided at the outlet opening of the grain tank.

Due to the inclination of the grain tank bottom walls, the volume of the storage area which is actually used for storage is relatively small with respect to the total volume which is available in a combine harvester.

It is a general tendency to constantly increase the capacity of combines by which this increase of capacity goes together with the enlargement of the grain tank capacity because it is then possible to harvest a longer time without having to empty said grain tank. Such an enlargement of the grain tank capacity becomes of particular importance when it deals with machines by which the capacity of the processed material is considerably increased per time unit.

Indeed, unloading the grain tank always is paired with a waste of time because the combine either stands still during the unloading or it can harvest further on but slower. The present invention aims at reducing the number of unloading times per time unit.

Increasing the grain tank capacity has been obtained in several ways. However, all of them have some inconveniences.

One way to increase the grain tank capacity is to make the bottom of the grain tank flatter and to make it extend over a larger surface. In this way a relatively large space which was otherwise lost, is now of use. However, in such an execution, it is necessary to provide special conveyor means for unloading the grain tank. Such conveyor means, as known in the art comprise a discharge auger, which extends over the whole width of the grain tank and has its discharge end close to the grain tank opening. Several supply augers are mounted on top of the relatively flat grain tank bottom in a direction generally perpendicular to the discharge auger for positively feeding the grain toward said auger.

This execution does enable to positively unload the grain tank but it has the disadvantage that the aforesaid supply augers press the grain against the auger blades of the discharge auger, which results in an unduly high grain crackage. Another disadvantage of the above described and known execution resides in the fact that the grain tank is completely unequally unloaded, that is, the grain which is situated at the opposite side of the discharge opening of the grain tank is discharged first. This unequal unloading also results in grain damage. The grain located at the side opposite to the discharge opening is urged through the grain mass located in between said opposite side and the discharge opening.

Further it is also known in the art to provide two parallel discharge augers on top of the grain tank bottom which extend transversely to the intended direction of travel, and which are spaced from each other and having in between saddle-shaped bottom walls for feeding the grain by gravity to said discharge augers. Both parallel augers feed the grain simultaneously to a single auger spaced below said parallel augers and provided close to the outlet opening of the grain tank. Said single auger conveys the grain towards the unloading tube which is connected to the outlet opening. This arrangement of unloading conveyors has also the same disadvantage as the same unequal discharging is obtained as described above, which also with this arrangement results in grain crackage. One may suggest that it is possible to increase the grain tank capacity in still other ways such as making the side walls higher or increase the dimensions in a direction transverse to the intended direction of travel. This is however not possible for other reasons dependent on regulation for road transport of agricultural machines and requirements for shipment of such combines e. g. by railways.

The present invention aims at an equal grain tank unloading device. The present invention relates to an improved grain tank unloading device for grain tanks with a big capacity and with a relatively flat bottom so as to use all the available space on the combine and with which the aforesaid and other disadvantages of the known systems are automatically excluded.

The improved grain tank unloading device mainly comprises, for this purpose, tow conveyor means such as augers which are installed parallel on top of the grain tank bottom, in relation with these conveyor means a third conveyor means such as an auger, which is generally perpendicularly directed on the first mentioned conveyors, by which one of the aforesaid parallel conveyor means lands in the proper unloading tube, which itself is located at the opposite side of the grain tank with respect to the conveyor means being located perpendicular to the parallel conveyor means; guard elements spaced above the conveyor means for controlling the material supply towards these conveyor means. By the above arrangement of the unloading device, the aim for completely even unloading of the grain tank without any grain crackage is obtained. Indeed, in this arrangement, any auger discharges the grain towards no more than one other single auger. This means that no grain is pressed between the auger blades of a further auger on places where the spaces between said auger blades have already been filled with grain from another supply auger. Thus, the "single-way" conveying means enable a grain unloading without any grain crackage. This advantage is still increased by the application of said conveyor means in combination with the guard elements which control the grain supply to said conveyor means and evenly divide said grain supply over the whole length of each single conveyor means, which results in a positive and even unloading of the grain tank.

Other objects and advantages will appear from the following description of an example of the invention, when considered in connection with the accompanying drawings, and the novel features will be particularly pointed out in the appended claims.

In the drawings:

FIG. 2 is a fragmentary and schematical top view of the improved grain tank unloading device as applied on the combine according to FIG. 1.

FIGS. 3, 4, and 5 are enlarged cross-sectional views respectively taken on the lines III—III, IV—IV and V—V of FIG. 2.

DESCRIPTION OF THE PREFERRED EMBODIMENT

The improved grain tank unloading device according to the invention mainly consists of two parallel augers, respectively 1 and 2 which are installed on the bottom of the grain tank 3 by which these augers are installed according to the cross direction of the machine and in the troughs, respectively, 4 and 5.

Trough 4 is connected with the front side of the grain tank 3 by an inclined bottom part 6, while it is connected via an inclined bottom part 7 which is directed upwards towards auger 2 with a bottom part 8 which is directed downwards towards the aforesaid auger 2 which is in connection with the aforesaid trough 5. The latter is connected with the rear side of the grain tank by a fourth inclined bottom part 9. An opening 10 is foreseen in the aforesaid trough 4 close to one side of the grain tank which opens into an auger tube 11 in which an auger 12 is mounted. This tube 11 is mounted on the one hand, underneath the aforesaid trough 4 and the inclined bottom 7 and on the other hand, opens into an aperture 13 which is foreseen in the aforesaid inclined bottom part 8.

The horizontal projection of auger 12 is directed according to the longitudinal direction of the machine and this auger is preferably directed perpendicular on the aforesaid parallel augers 1 and 2.

Preferably, the diameter of the aforesaid auger 2 will be greater than the diameter of the aforesaid auger 1 whilst the pitch of augers 1 and 2 is reversed towards one another.

Also, the aforesaid auger 12 will preferably show a diameter which is somewhat larger than the diameter of auger 1, but smaller than the diameter of auger 2.

The extreme end of auger 2 which is directed towards the unloading tube 14 of the combine is a bit shorter than the width of grain tank 3 by which this auger 2 ends in the vicinity of an opening 15 which, on the one hand is provided in the sloping bottom part 9 and on the other hand in trough 5 and by which this opening 15 lands in housing 16 on which the unloading tube 14 is rotatably fixed in a known way. Thus, the aforesaid auger 2 has no auger blades in the vicinity of opening 15.

A shaft 17 is provided above the auger 2 and extends over the whole width of the grain tank on which valves are provided, respectively, 15 and 19 which extend above opening 15, which are free to pivot, and of which the free extreme ends rest, respectively on the inclined bottom part 7 and on plate 20, which on the location of the input part of the aforesaid unloading tube 14 is installed in this grain tank, with the objective to save a space on the location of the unloading tube 14 for enabling to turn the unloading tube. In this way, one obtains a grain tank with a greater capacity, especially by making the grain tank bottom flat without having to displace other parts such as cylinder, straw beater, eventually the separation cylinder, and the drive of these parts of which displacement a less proper function of the machine could be the consequence.

The drive of the above described elements is mainly as follows: On shafts 21 and 22, respectively of the augers 1 and 2, sprockets, respectively 23 and 24 are fixed outside the tank 3 and which are connected via a chain 25 with a sprocket 26 which is installed on a shaft 27. This shaft 27 is beared in a housing 28 which is installed underneath the aforesaid housing 16 on which the unloading tube 14 is pivotally mounted.

A sprocket 29 is fixed on the aforesaid shaft 21 which is connected via a chain 30 with a sprocket 31 which is fixed on a shaft 32 which is beared in a housing 33 which itself is secured against the free extreme end of the aforesaid auger trough 11. A bevel gear 34 is fixed on shaft 32 which continuously acts with a bevel gear 35 which itself is fixed in a suitable way on the shaft 36 of screw auger 12. Pivotable supports, respectively 37 and 38 are pivotally mounted on the aforesaid shaft 27, which are connected with each other in a suitable way and by which a shaft 39 is beared on which on the one hand, a sprocket 40 and on the other hand a belt sheave 41 is fixed. Sprocket 40 is connected via a chain 42 with a sprocket 43 which is fixed on the aforesaid shaft 27 whilst the aforesaid belt sheave 41 is connected via a belt 44 with an unshown belt sheave which is normally situated on the engine output shaft.

Finally, a bevel gear 45 is applied in a known way on the aforesaid shaft 27 which continuously acts with a bevel gear 46 which is fixed on shaft 47 of auger 48 which is situated in the aforesaid housing 16 and which in a suitable way is drivingly connected with the unknown auger which is situated in the unloading tube.

The switching on and off of the grain tank unloading will preferably take place from the steering platform by means of a transmission mechanism which goes over a so-called "dead center" and which is formed by a lever transmission which is connected in a suitable way with the pivotable supports 37 and 38.

Figure 1:
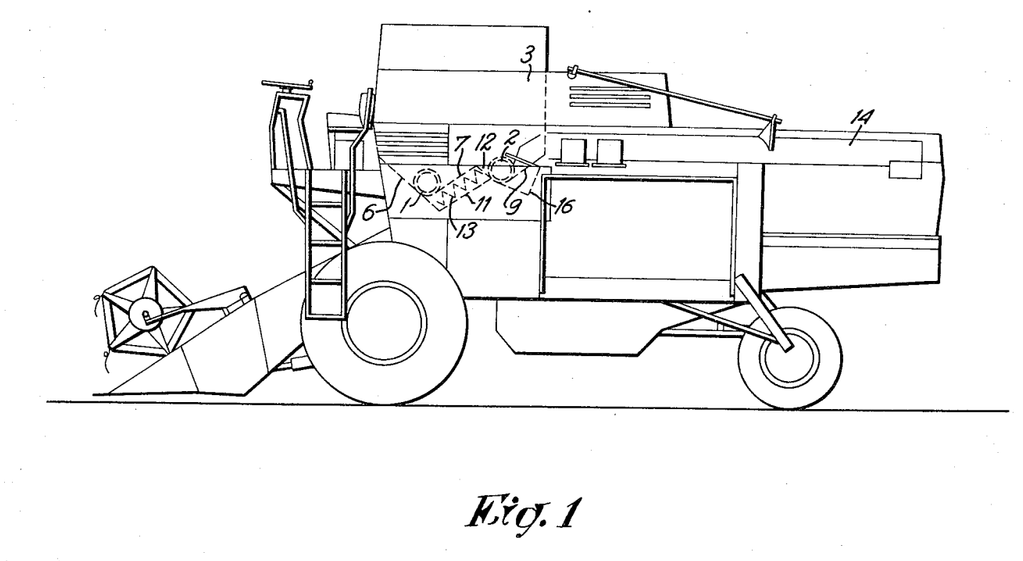
FIG. 1 is a schematical side view of a combine provided with an improved grain tank unloading device according to the invention.
Figure 4:
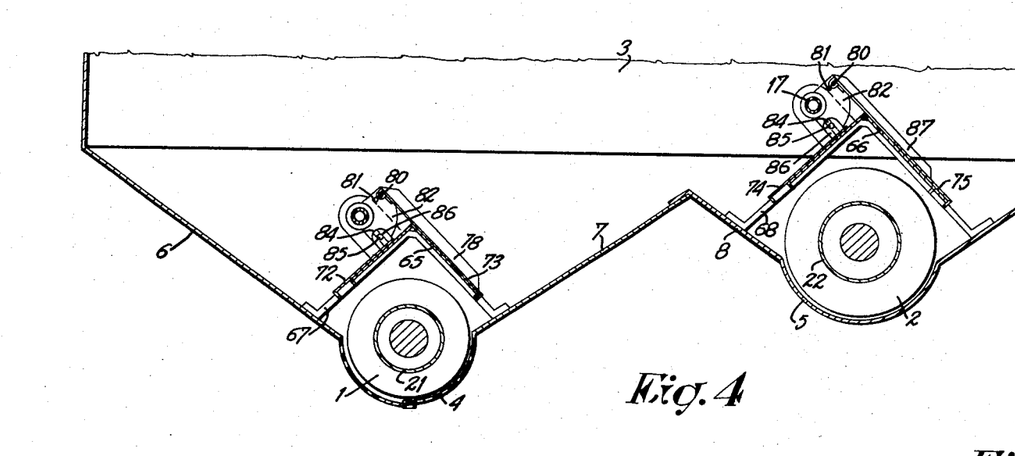
Figure 5:
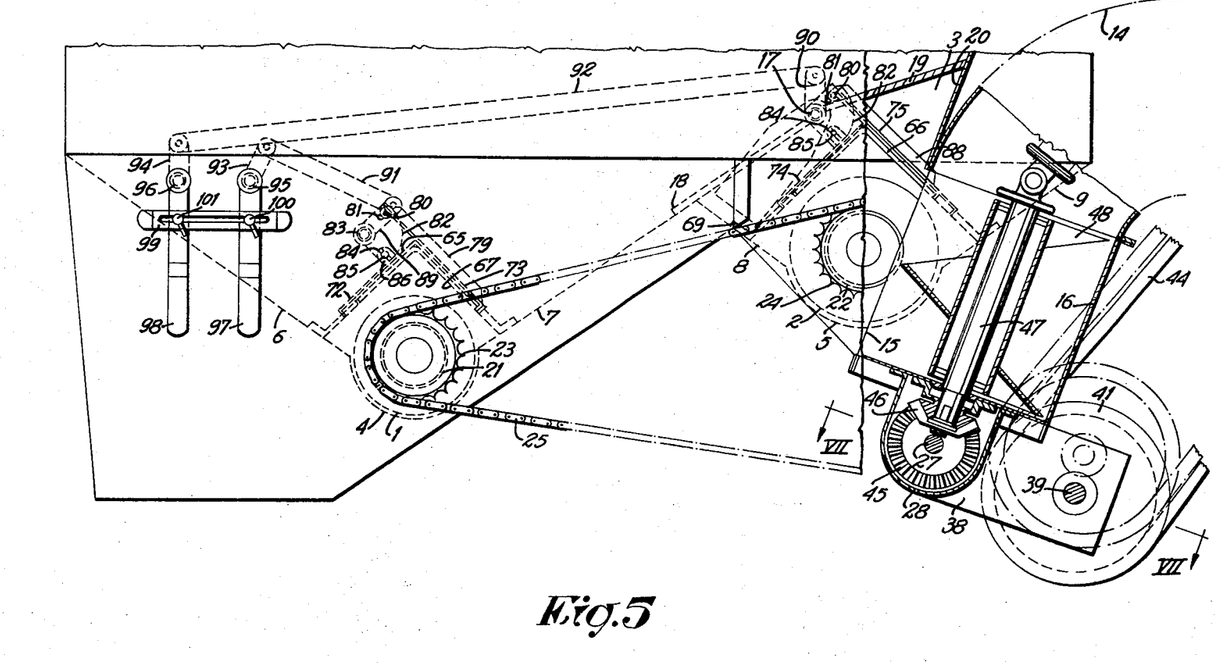
Figure 6:
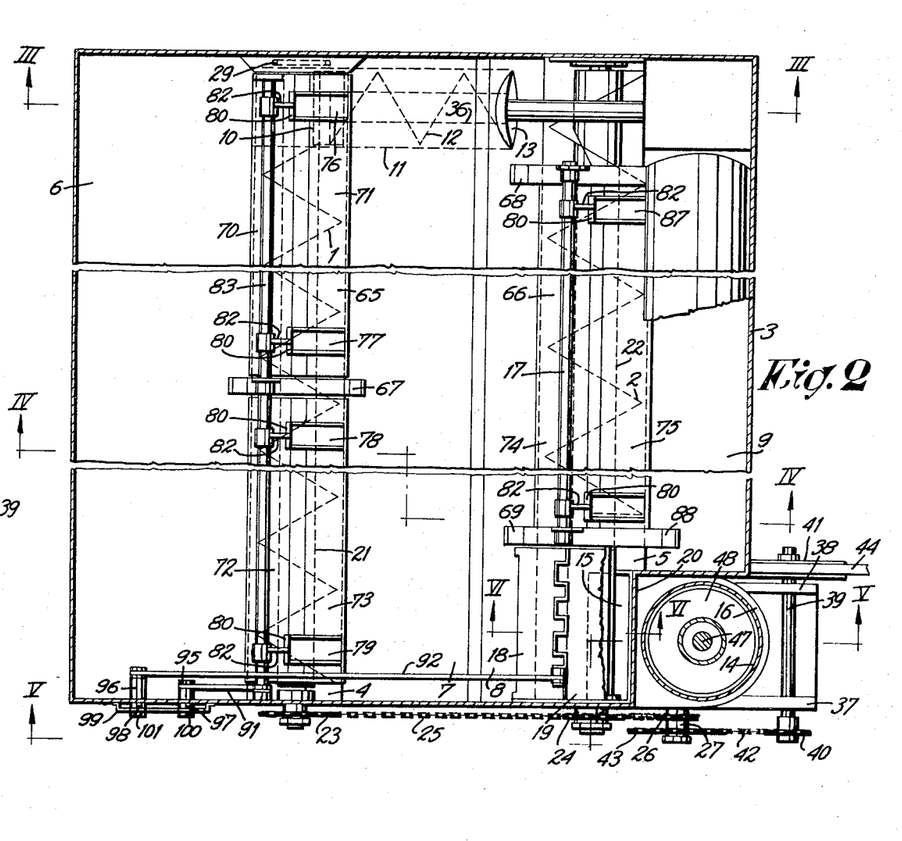
FIG. 6 is an enlarged cross-sectional view taken on line VI—IV of FIG. 2.
Figure 7:
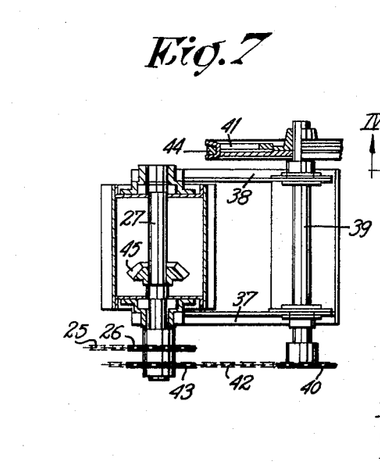
FIG. 7 is a schematical sectional view on line VII—VII of FIG. 5.
Figure 8:
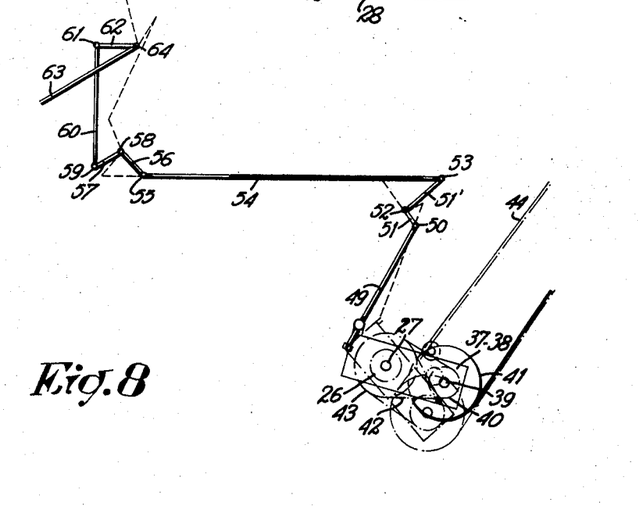
FIG. 8 is a schematical side view of the switching on and off mechanism of the improved grain tank unloading device according to the invention.
Figure 9:
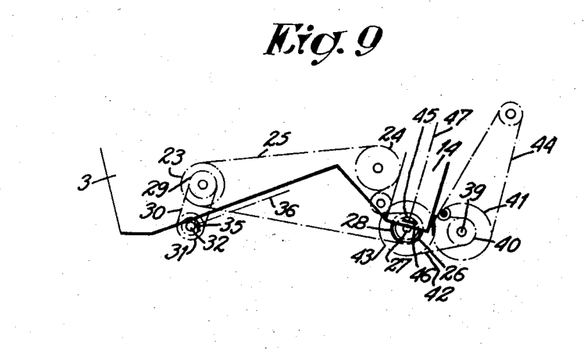
FIG. 9 is a schematical side view of the proper improved grain tank unloading device.

This transmission is schematically shown in FIG. 8 and mainly comprises a rod 49 which is connected with the pivotable supports 37 and 38 and which is connected via a pivot point 50 with a lever 51 which is pivotally mounted on a pivot axis 52. This lever 51 shows a second arm 51' which is connected with a rod 54 via a spindle 53.

The latter is connected at its second free extreme end via a spindle 55 with a bent lever having two arms respectively 56 and 57 and which lever can pivot around a fixed shaft 58. The free extreme end of arm 57 of the aforesaid lever is connected via a turning spindle 59 with a rod 60 which itself is connected towards its second extreme end via a spindle 61 with a bent lever having two arms 62 and 63 which can pivot around a fixed shaft 64. Arm 63 will be executed as a handle and be installed in the vicinity of the driver's seat.

A narrow shaped plate is installed on top of each auger 1 and 2, respectively 65 and 66. Plate 65 is fixed against the side walls of grain tank 3 and is beared in the midddle of the grain tank by a support 67 while the aforesaid plate 66 is installed on the bottom of the grain tank by means of supports 68 and 69.

It especially appears from drawing 2 that the last plate 66 is only installed between these supports 68 and 69.

Plates, respectively 70–71–72–73 and 74–75 are installed on each side face of the so formed L-shaped profiles 65 and 66, by which all these plates are connected as such with the according L-shaped profile 65 and 66, that they can be moved with respect to these profiles but are connected with these profiles for instance by applying grooves in the plates 70 up to and including 75 which can co-operate with studs which are fixed on the profiles 65 and 66 and which are installed through these grooves.

In this execution, supports are fixed, respectively 76–77 and 78–79 on the aforesaid plates 71 and 73 which are each connected at the free extreme end with a spindle 80 which is installed in a groove 81 of pivot part 82. These pivot parts 82 are fixed on a common shaft 83 and show a second groove 84 with which a stud 85 co-operates which is connected with a support 86 which is fixed on the plates 70–72.

Plates 74 and 75 are mounted in a similar way with similar adjusting means 82.

A lever is installed on one side of the grain tank on each of the shafts 83 and 17, respectively 89 and 90, which are pivotally connected with rods, respectively 91 and 92, which themselves are pivotally connected at their second extreme end with levers, respectively 93 and 94. These levers are fixed on shafts, respectively 95 and 96 which pass through the aforesaid grain tank wall and which are provided outside the grain tank with control handles, respectively 97 and 98, which pass through a brace 99 and by which each of these handles 97 and 98 can be fixed via clamping elements respectively 100 and 101, with respect to the grain tank.

Operation

For unloading the grain tank, the pivotable supports 37–38 are pivoted downwards so as to tighten the belt 44; by moving handle 63 upwards by which the belt 44 starts to positively drive pulley 41 and, thus, also to drive the unloading tube auger via shaft 39, sprocket and chain transmission 40–42–43 and bevel gears 45–46. The parallel augers mounted in the grain tank are driven in a similar way via sprockets and chain transmission 26–25–24–23. The first parallel auger shaft 21 also drives the auger 12 in a similar way via sprocket chain and bevel gear transmissions 29, 30, 31, 34, and 35.

The grain situated on the bottom of the grain tank is fed to the parallel augers through the openings between the grain tank bottom and the adjustable plates 70–71–72–73–74–75. When seeds which do not slide or slide with difficulty over the bottom plates 6–7–8–9, have to be unloaded, then unloading may be improved by continuously displacing the aforesaid plates by means of handles 97–98, so as to obtain a constant agitation among the seeds being supplied to the discharge augers. Generally, the L-shaped covers 65 and 66 together with the adjustable plates prevent the grain from pressing too much on the augers and enable to adjust the grain supply into the auger troughs.

The grain stored above the first augers is conveyed towards the side wall, situated opposite to the unloading tube, where it is discharged into the auger tube 11, which itself conveys the grain towards the second parallel auger 2. Said second parallel auger is constructed or driven in such a manner that the volume of grain supplied to this auger from the first auger is about half the conveying capacity of said second parallel auger, so as to enable the grain stored above said second parallel auger to be discharged simultaneously. The second parallel auger discharges the grain to the unloading tube inlet opening at the side opposite to the discharge end of the first parallel auger.

If for some reasons the second auger discharges a larger volume of grain to the unloading tube inlet opening than the unloading auger in said tube can convey then the valves 18 and 19 are opened by the grain pressure and the volume of grain which cannot be discharged to the unloading tube is directed into the grain tank.

The above described invention enables a completely even unloading of the grain tank of combines, having a relatively flat bottom and a large capacity, without the grain being damaged. This is mainly due to the fact that the conveyor means are mounted in a single-line configuration, in combination with the adjustable supply plates.

Modifications

Other features and advantages of the present invention will occur to those skilled in the art, as will many modifications and alterations in the preferred embodiment of the invention described herein, all of which may be achieved without departure from the spirit and scope of the invention.

It will for instance be understood that the same good results may be obtained with the three augers having the same diameters, but having different steps or being driven at different speeds by which the second parallel auger has the largest step of is driven at the highest speed.

I claim:

1. Unloading device for unloading grain from agricultural machines such as combine harvesters having threshing separating and cleaning means for threshing, separating and cleaning the grain from the remainder of the crop material, grain storage means including side walls and a bottom for temporarily storing the cleaned grain, said storage means having a discharge opening; said unloading device comprising:

first, second and third conveyor means disposed within said grain storage means and adjacent the bottom of the grain storage means, said first conveyor means in the storage means having a discharge end proximate to a side wall for conveying grain towards and discharging grain proximate to said side wall; said second conveyor means extending generally perpendicular to said first conveyor means, said second conveyor having a discharge end and a second end, the second end being mounted adjacent the discharge end of the first conveyor means for receiving grain at the discharge end of the first conveyor means and for conveying said grain towards its discharge end; and said third conveyor means extending generally parallel to the first conveyor means for receiving grain from the second conveyor means and for conveying it towards and discharging it proximate to said discharge opening of the storage means, opposite to said side wall.

2. In combination with the grain storage means of agricultural machines such as a combine harvester, the grain storage means having side walls and a bottom for temporarily storing the threshed and cleaned grain; said storage means having a discharge opening, the combination therewith of an unloading device comprising first conveyor means extending in the storage means and having a discharge end proximate to a side wall for conveying grain towards and discharging grain proximate to said side wall, second conveyor means extending generally perpendicular to said first conveyor means for receiving grain at the discharge end of the first conveyor means and for conveying said grain towards its discharge end; third conveyor means extending generally parallel to the first conveyor means for receiving grain from said second conveyor means and for conveying it towards and discharging it proximate to said discharge opening of the storage means, opposite to said side wall, said first and third conveyors being augers open at their sides to the grain within the grain storage means whereby grain within the grain storage means may be contacted by the side of both of the augers and subsequently conveyed.

3. Unloading device as set forth in claim 1, wherein the storage means is a grain tank mounted on a combine harvester, wherein the parallel conveyor means are augers rotating on troughs which are located on the lower parts of the bottom and wherein the second conveyor means is an auger rotating in a tube located proximate to the grain tank bottom at the opposite side of the discharge opening.

4. Unloading device as set forth in claim 3, comprising guard elements spaced above the parallel augers for controlling the grain supply towards these augers.

5. Unloading device as set forth in claim 1, wherein the storage means is a grain tank mounted on a combine harvester, wherein the parallel conveyor means are augers transversely extending to the intended direction of travel, the first auger for conveying grain away from the discharge opening, the second parallel auger for conveying grain towards the discharge opening.

6. Unloading device as set forth in claim 1, wherein the storage means is a grain tank mounted on a combine harvester; wherein the second conveyor means is an auger rotating in an auger tube, said auger and auger tube being partially spaced below the grain tank bottom, extending at both free ends through said grain tank bottom for conveying grain from the first conveyor means to the third conveyor means, and further being located in the vicinity of the side wall opposite to the discharge opening.

7. Unloading device as set forth in claim 1, wherein the conveyor means are augers; and wherein the third auger has a larger diameter than the second auger and wherein said second auger has a larger diameter than the first auger.

8. Unloading device as set forth in claim 1 wherein the first and third conveyor means are augers open at their sides to the grain within the grain storage means; and wherein the third auger has a larger diameter than the first auger.

9. Unloading device as set forth in claim 2, wherein the pitch of the parallel augers is in an opposite direction.

10. Unloading device as set forth in claim 1, comprising pivotally supported valves spaced above the discharge end of the third conveyor means and where the discharge opening of the storage means for opening and for discharging supplied grain via the valve openings into the grain tank when more grain is supplied to the discharge opening, than can be discharged through the discharge opening.

11. Unloading device as set forth in claim 4, comprising adjustable grain supply valves displaceably mounted to the guard elements; for adjustably controlling the grain supply towards the augers; transmission means extending from the grain supply valves to the outside of the grain tank for adjusting the position of the grain supply valves.

* * * * *